Dec. 17, 1935.  L. I. FRIEDLAENDER  2,024,444
CAR LOADING DEVICE
Filed Dec. 11, 1931   2 Sheets-Sheet 1
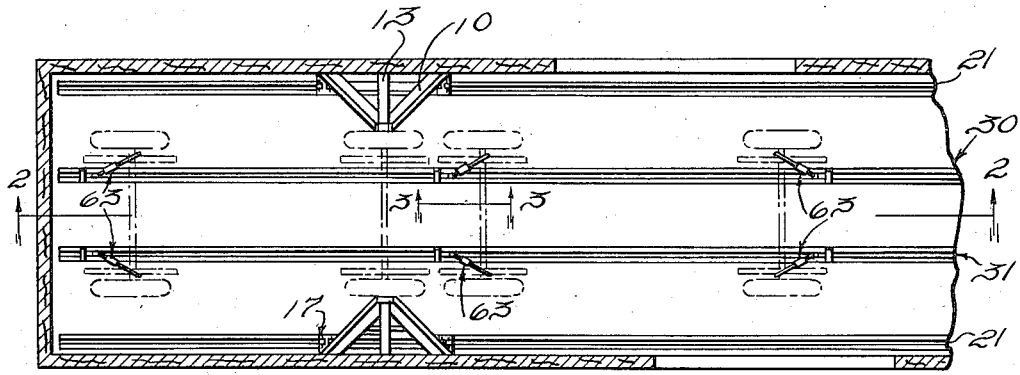
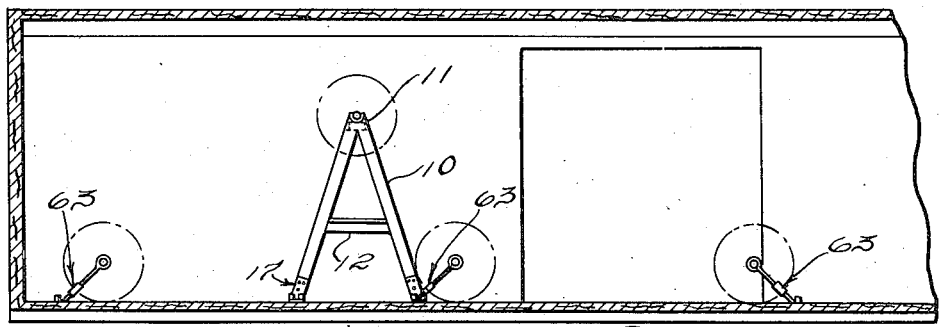
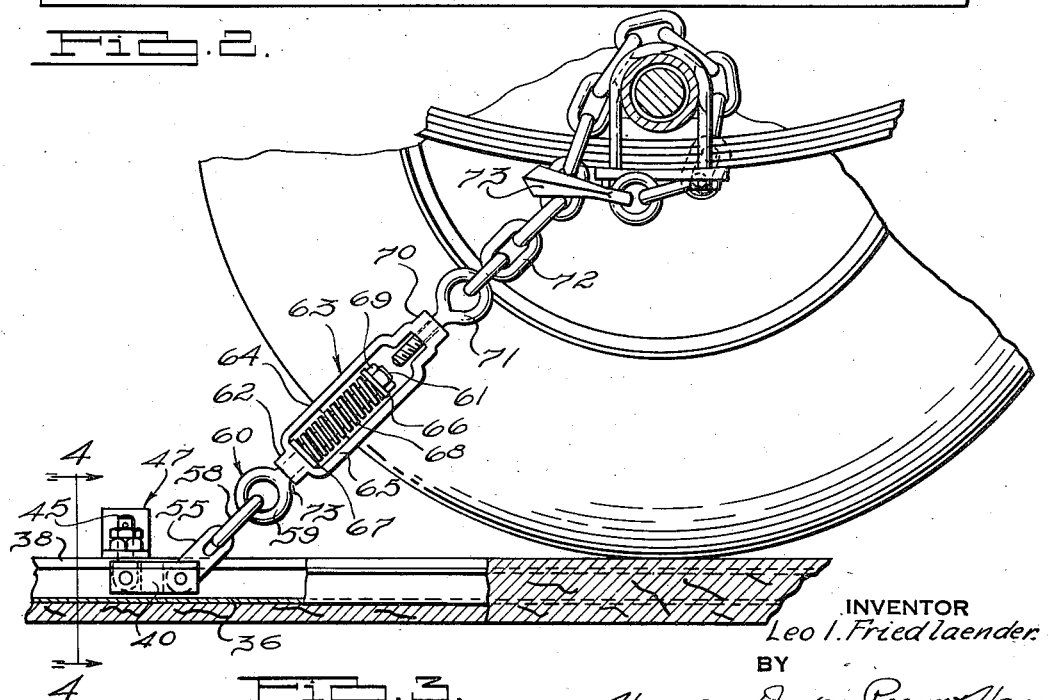
INVENTOR
Leo I. Friedlaender
BY
ATTORNEYS Dec. 17, 1935.  L. I. FRIEDLAENDER  2,024,444
CAR LOADING DEVICE
Filed Dec. 11, 1931   2 Sheets-Sheet 2

INVENTOR
Leo I. Friedlaender.
BY
ATTORNEYS

Patented Dec. 17, 1935

2,024,444

UNITED STATES PATENT OFFICE 2,024,444

CAR LOADING DEVICE

Leo I. Friedlaender, Detroit, Mich., assignor to Evans Products Company, a corporation of Delaware Application December 11, 1931, Serial No. 580,380

7 Claims. (Cl. 105—368)

The invention relates to loading devices and it has particular relation to a device for securing motor vehicles or the like in freight cars or other suitable conveyances, for transportation purposes.

In certain respects the invention is related to my co-pending applications for patent on car loading devices, identified as follows:—Serial No. 554,634, filed Aug. 3, 1931; Serial No. 554,672, filed Aug. 3, 1931; Serial No. 555,485, filed Aug. 6, 1931; Serial No. 557,056, filed Aug. 14, 1931, and Serial No. 557,057, filed Aug. 14, 1931.

The principal objects of the present invention are to provide an improved car loading device adapted to cooperate with a groove in a wall of the conveyance, and which in its inoperative position, is disposed out of the way and in such groove; to provide an improved car loading device of the general character mentioned, in which improved means are utilized for cushioning the vehicle against impacts such as those caused by sudden starting and stopping of the conveyance, or acceleration or deceleration during movement of the latter; to provide a cushioning means of this character, which may gradually cushion the force of the impact and finally operate as a solid connecting member between the conveyance and the vehicle; to provide a cushioning means such as described, which will normally be resilient under ordinary impacts but which will act as a solid member if the force of the impact is greater than a predetermined amount; and in general to provide a car loading device of economical and simple construction, which will efficiently serve for the purpose of mounting a vehicle in a freight car or the like, which can readily be assembled with respect to the vehicle, or disposed in an out of the way position, and which will act as a positive connecting means although resilient within the usual range of impact forces occurring as a result of factors previously mentioned.

For a better understanding of the invention, reference may be had to the accompanying drawings forming a part of the specification, wherein—

Fig. 1 is a fragmentary, longitudinal cross-sectional view of a freight car illustrating the manner in which vehicles may be mounted therein for transportation purposes, according to one form of the invention;

Fig. 2 is a cross-sectional view taken substantially along the line 2—2 of Fig. 1;

Fig. 3 is a cross-sectional view on a larger scale taken substantially along the line 3—3 of Fig. 1, and illustrating particularly the manner of fastening the vehicle axle to the floor of the conveyance;

Figure 4:
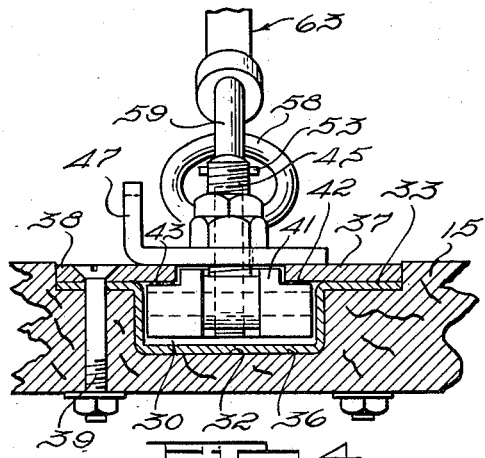
Fig. 4 is a cross-sectional view on a larger scale taken substantially along the line 4—4 of Fig. 3.

The present invention relates particularly to the manner of securing a part of the vehicle to a wall of the freight car, either when the vehicle rests at both ends directly on the floor of the freight car, or when one end of the vehicle is elevated, or in other words when the vehicle is so mounted that it is decked with respect to another vehicle. The particular means for decking or elevating one end of the vehicle shown in the drawings forms no part of the present invention, but in order that this particular decking means be understood, it is desired to describe it briefly.

Figure 7:
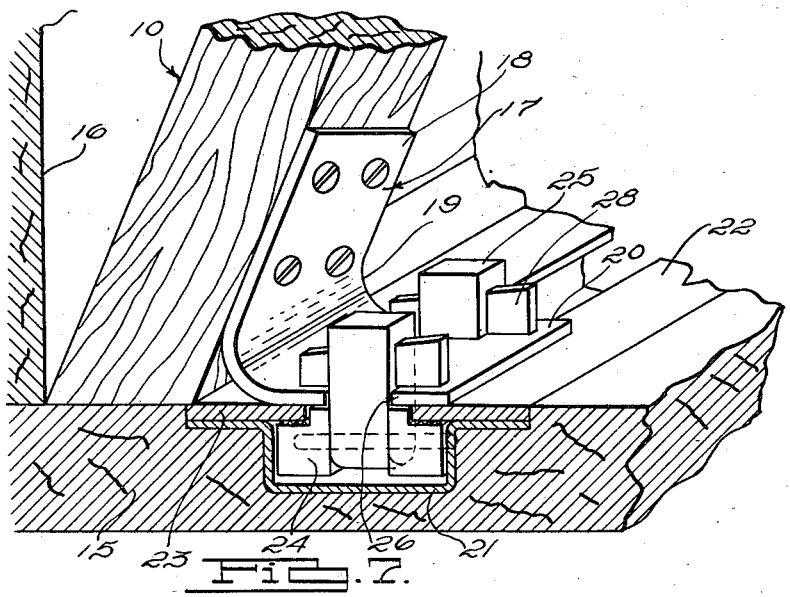
Fig. 7 is a perspective, and cross-sectional view of a side corner portion of the freight car, illustrating the manner in which the legs of the decking device shown by Figs. 1 and 2, is secured to the floor of the freight car.

It will be noted in Figs. 1 and 2 that the decking device comprises an inverted V-shaped member 10 at each side of the car, the apex of which has a recess 11 shown by Fig. 2, for receiving a portion of the vehicle axle that is elevated. One or more bracing members 12 may connect the leg portions of the member 10, and a side brace 13 shown by Fig. 1 prevents side swaying of the elevated part of the vehicle. As shown particularly by Fig. 7 each of the legs of the member 10 at its lower end abuts the floor of the freight car indicated at 15 at the junction of the floor with one of the side walls 16 of the car. A plate 17 having a portion 18 nailed or otherwise secured to each leg of the member 10, has an intermediate curved portion 19 and a horizontal portion 20 which is adapted to rest upon the floor 15. At opposite sides the freight car floor is provided with a groove 21 and plates 22 and 23 slightly overlapping the groove are utilized to maintain an anchor block 24 therein. This block at opposite ends has bars 25 pivotally associated therewith, and such bars in their vertical position are adapted to project into slots 26 formed in opposite ends of the base portion 20 of the plate 17. Wedge pins 28 disposed in complementary openings in the bars 25 above the plate 20 are utilized for positively maintaining the block against the undersides of the plates 22 and 23 and hence the plate 17 positively secured in position. The arcuate plate portion 19 serves as a resilient member under certain conditions during transportation of the vehicle, when forces tend to move the member 10.

For securing the other end of the vehicle on the floor of the freight car or for securing both axles of an adjacent vehicle to the floor, the latter is provided with centrally located grooves 30 and 31 disposed in spaced relation and extending substantially throughout the length of the car. While each of these grooves corresponds to the groove 21 shown in Fig. 7, it is desired to give a more detailed description thereof in view of the fact that the invention is particularly related to loading devices associated with the grooves. As shown by Fig. 4, each of the grooves, groove 30 being shown, comprises a channel shaped recess 32 extending in the floor, and shallow side recesses 33 at opposite sides of the recess 32 and in the upper surface of the floor. A channel shaped member 36 substantially complementary to the recesses thus described, is maintained therein by elongated metal straps 37 and 38, which are secured to the floor and to the channel member by means of bolts 39. It will be noted that the upper surfaces of such straps are flush with the car floor surface.

Figure 5:
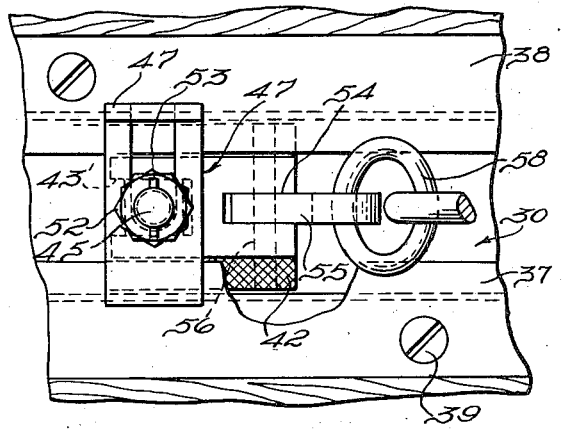
Fig. 5 is a plan view of the construction shown by Fig. 4.
Figure 6:
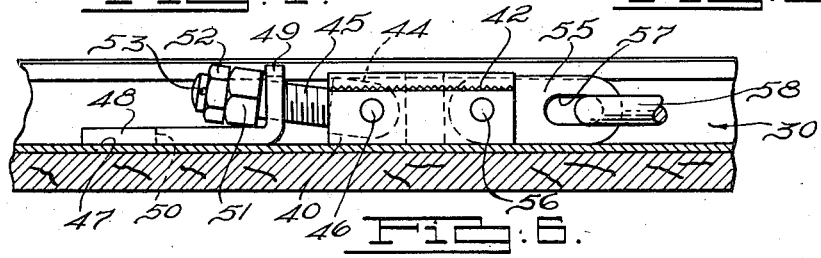
Fig. 6 is a fragmentary, longitudinal cross-sectional view taken through one of the grooves 10 in the freight car floor, particularly illustrating the manner in which the axle anchoring device is mounted in the groove and in an out of the way position when it is not in use.

Referring also to Figs. 5 and 6, an anchor block 40 is disposed in the groove 30 and such anchoring block has a central portion 41 projecting upwardly between adjacent edges of the straps 37 and 38 when the block is in its operative position. At opposite sides of the projection 41, the block is provided with knurled surfaces 42 and 43 adapted to cooperate respectively with the underside of those portions of the straps 37 and 38 overlapping the groove. At one end as shown best by Figs. 4 and 5, the block 40 has a slot 43' located midway between its sides and this slot is adapted to cooperate with an eye 44 rigidly or integrally associated with a bolt 45. The eye portion 44 is pivotally arranged in the slot by means of a pin 46 extending through the slot and sides of the block.

It is apparent from this description, that the bolt 45 may be swung around the pin 46 to an upright position without altering the position of the block. For fastening the block in the groove, an L-shaped plate 47 is provided which has a base portion 48 and a right angular, flange portion 49. A slot 50 provided in the plate extends from an intermediate point in the base to substantially the outer edge of the flange 49 and is adapted to receive the bolt 45. In swinging the bolt 45 to its upright position, the plate 47 may be lifted along therewith until the base part 48 of the plate is above the block 40 and parallel thereto, it being understood that in so moving the plate, the bolt will move out of the slot in the flange, into the slotted portion of the base portion 48 of the plate. Then the plate may be turned ninety degrees into a position shown by Fig. 4 in which opposite end portions thereof will be disposed over the adjacent side portions of the straps 37 and 38 at opposite sides of the groove. Nuts 51 and 52 on the outer end of the bolt may be manipulated to secure and lock the plate against the upper sides of the straps 37 and 38, it being understood that in so manipulating the nuts, that the knurled portions 42 and 43 of the anchoring block will be tightly drawn against the undersides of the straps. A pin 53 extending through an opening in the outer end of the bolt is utilized for preventing the nuts from separating from such bolt and normally maintains the plate 47 and bolt assembled.

At its opposite end, the block 40 is provided with a second slot 54 of smaller width than the slot 43, and this slot is adapted to cooperate with a link 55, pivotally associated with the block by means of a pin 56 extending through the slot and side portions of the block. This link at its opposite end has an elongated slot 57 which engages a ring or chain link 58. Now as shown best by Fig. 3, the ring 58 is connected to an eye 59 of an eye bolt 60 having a shank 61 slidably projecting through a bearing portion 62 of a turn buckle member 63 having spaced side portions 64 and 65. That portion of the bolt within the turnbuckle member has collars 66 and 67 at opposite ends, which abut a helical spring 68 encircling that part of the bolt between the collars. A nut 69 on the outer end of the shank maintains the parts just described assembled. The spring 68 is constructed of wire which is preferably square shaped in cross section and it is apparent that when such spring is compressed sufficiently, the coils thereof will finally contact and the spring in effect will constitute a solid, metal, force-resisting element.

The opposite end of the turnbuckle has a similar bearing portion 70 into which the shank of an eye bolt 71 is threaded. This eye bolt is connected to a chain 72 having a hook 73 at its outer end. The chain is adapted to be thrown around the axle of the vehicle and then the hook 73 engaged with the intermediate portion of the chain to securely maintain the parts associated with the axle.

As shown particularly by Figs. 1 and 3, that part of the chain engaging the axle also extends around the base portion of the vehicle spring in such manner that movement of the chain longitudinally of the axle is prevented. Also as shown by Fig. 1, the loading devices secured in the grooves 30 and 31 extending to opposite end portions of the axle, are angled slightly or in other words diverge as they extend to the axle, and this arrangement serves to prevent lateral movement of the axle with respect to the freight car.

Between the eye 59 of eye bolt 60 and the bearing portion 62 on the turnbuckle 63, a slight space 73 is provided and when the spring in the turnbuckle is under initial tension this space is barely sufficient to permit insertion of a finger thereinto and consequently, whether or not the spring is under tension, can be readily determined.

In mounting an automobile in the freight car, as stated previously, the chain anchoring devices may be utilized in conjunction with both axles, or one axle may be elevated or in other words decked by the devices previously described and shown by Figs. 1 and 2. Assuming that both axles are secured to the anchoring blocks in the grooves 31 and 32 as shown incidental to the vehicle at the right side of Fig. 1, the chain anchoring devices are disposed at the left side of the left axle and at the right side of the right axle. Now under this set of circumstances, if the freight car should accidentally stop or decelerate in its movement, it is apparent that the chain anchoring devices at the left of the left axle may tend to slightly loosen, but that the chain anchoring devices at the right of the right axle, will be tensioned. When this occurs the spring 68 will be subjected to compression and normally this spring is so arranged and constructed that under normal impact forces the coils of the spring will not actually contact to provide a solid force taking element. However, if the impact is sufficient the coils of the spring actually will contact to constitute a solid force-taking element positively preventing any further movement of the vehicle. Normally, however, the springs will merely cushion the impact forces and gradually return the vehicle to its original position with respect to the freight car. If the impact is in the opposite direction as for example should the freight car accelerate in its movement, the anchoring devices at the left of the left axle will operate in the previously described manner to cushion movement of the vehicle and finally positively prevent any further movement.

When it is desired to use the freight car for other purposes, it is apparent that the anchoring devices shown by Figs. 4, 5, and 6 may be arranged in the grooves 30 and 31 below the top thereof and hence in out of the way positions where they will not interfere with ordinary use of the freight car. Where decking devices as described are used, normally they will be removed when not in use.

From the above description it is apparent that simple and inexpensive loading devices are provided for securing automobiles in freight cars, which will operate efficiently to cushion movement of the vehicle and positively prevent undesirable movement thereof. It is also apparent that the loading devices not only prevent longitudinal movement of the vehicle in the freight car except cushioned movement in the manner described, but that they similarly prevent lateral movement of the vehicle in the car. Also such loading devices may be readily associated with the vehicle without requiring much manual effort. In this connection it is manifest that the anchor blocks may be secured in the grooves as described, the chains can be swung around the axles and after thus manipulating the device, that the turnbuckle 63 can be turned until the spring is placed under the desired degree of tension. In disassembling each device the nuts 51 and 52 may be loosened first, thus releasing the anchoring block, or the turnbuckle may be loosened and then the anchor block released.

Although only one form of the invention has been shown and described in detail, it will be apparent to those skilled in the art that various modifications may be made without departing from the scope of the appended claims.

I claim:

1. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, and a plate having a base and flange portion slotted for receiving the pivoted member, whereby the member can cooperate with the slot in the flange portion of the plate when its base is in the groove, or with the slot in the base portion when the latter is over the block.

2. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, and a plate having a base and flange portion slotted for receiving the pivoted member, whereby the member can cooperate with the slot in the flange portion of the plate when its base is in the groove, or with the slot in the base portion when the latter is over the block, said slots in the flange and base portions of the plate being continuous, whereby it is unnecessary to remove the pivoted member in associating it either with the flange or base portion.

3. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, and a plate having a base and flange portion slotted for receiving the pivoted member, whereby the member can cooperate with the slot in the flange portion of the plate when its base is in the groove, or with the slot in the base portion when the latter is over the block, said slots permitting turning of the plate on the pivotal member.

4. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, a plate having a base and flange portion slotted for receiving the pivoted member, whereby the member can cooperate with the slot in the flange portion of the plate when its base is in the groove, or with the slot in the base portion when the latter is over the block, and means on the outer end of the pivoted member for clamping the plate against the outer side of the groove, and the block against the underside of the undercut portion thereof.

5. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, a plate having a base and flange portion slotted for receiving the pivoted member, whereby the member can cooperate with the slot in the flange portion of the plate when its base is in the groove, or with the slot in the base portion when the latter is over the block, said slots in the flange and base portions of the plate being continuous, whereby it is unnecessary to remove the pivoted member in associating it either with the flange or base portion, and means on the outer end of the pivoted member for maintaining the parts assembled regardless of position thereof.

6. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, a plate having a base and flange portion slotted for receiving the pivoted member, whereby the member can cooperate with the slot in the flange portion of the plate when its base is in the groove, or with the slot in the base portion when the latter is over the block, said slots permitting turning of the plate on the pivotal member, and means on the outer end of the pivoted member for maintaining the latter and the plate assembled regardless of position thereof.

7. In a car loading device for securing a vehicle in a freight car or the like, one of the walls of the car having an undercut groove therein, an anchor block in the groove and having a side portion adapted to cooperate with the undercut portion of the groove, a member pivotally connected to the block and adapted to be swung either to an upright position or to lay in the groove, and a plate having a base and flange portion slotted for receiving the pivoted member, whereby the member can cooperate with the slot in the flange portion of the plate when its base is in the groove, or with the slot in the base portion when the latter is over the block, said slots in the flange and base portions of the plate being continuous, whereby it is unnecessary to remove the pivoted member in associating it either with the flange or base portion, such slots permitting turning of the plate on the pivoted member.

LEO I. FRIEDLAENDER.